United States Patent [19]

Swann

[11] Patent Number: 4,656,600

[45] Date of Patent: Apr. 7, 1987

[54] MIXING OF PRINTING INKS

[75] Inventor: David J. Swann, Girton, United Kingdom

[73] Assignee: Cherlyn Electronics Limited, Cambridgeshire, England

[21] Appl. No.: 656,322

[22] Filed: Oct. 1, 1984

[30] Foreign Application Priority Data

Oct. 4, 1983 [GB] United Kingdom ................ 8326495

[51] Int. Cl.⁴ ...................... G01G 19/22; G01G 23/30
[52] U.S. Cl. ...................................... 364/567; 177/70; 177/177
[58] Field of Search ....................... 177/1, 70; 364/526, 364/567, 479

[56] References Cited

U.S. PATENT DOCUMENTS 3,878,907  4/1975  Morick .................................. 177/70
3,959,636  5/1976  Johnson et al. .................. 364/567 X
4,469,146  9/1984  Campbell et al. ................ 177/70 X

*Primary Examiner*—George H. Miller, Jr.
*Attorney, Agent, or Firm*—Penrose Lucas Albright

[57] ABSTRACT

A special purpose microprocessor based system, comprising weighing element, stored printing ink formulation data, and operator interface designed to aid the process of mixing defined colors and shades of printing inks from a small number of constituent basic color inks. Once the color and quantity of ink have been entered, the system prompts the operator through the mixing process by displaying constituent basic color inks and quantity to be added. The actual amount of constituent basic color ink then added is monitored by the weighing element. Repeated operation for each constituent thus ensures accurate, reproducible and error free mixing to the required formulation.

9 Claims, 3 Drawing Figures

MIXING OF PRINTING INKS

DESCRIPTION

1. Field of the Invention

This invention relates to mixing of printing inks, and in particular to a system for and method of making printing ink formulations from constituent basic color inks.

2. Background to the Invention

Desired shades and color of printing inks may be obtained by mixing together a number of constituent basic color inks according to a desired formulation. Various color formula guides exist, and provide data for the proportions of constituent basic color inks. In particular the PANTONE (Registered Trade Mark) color matching system is widely used.

For a printer to make a chosen color of ink, he must first calculate the weight of each constituent basic color ink, then accurately weigh out the quantities of the constituent inks. Finally, the constituent basic color inks are thoroughly mixed. The process is both time consuming, and susceptible to errors.

SUMMARY OF THE INVENTION

According to one aspect of the present invention there is provided a system for making a selected printing ink formulation from a plurality of printing ink formulations, each said formulation having predetermined proportions of constituent basic color inks by weight, the system comprising weighing means for weighing the constituent basic color inks, memory means storing the predetermined proportions of each of the plurality of formulations, user interface means enabling a user to select one of said formulations, and display means for displaying the weight of each constituent basic color ink to be added to the weighing means and for monitoring the weight addition of each successive constituent basic color ink, to enable the user to make the selected formulation.

Preferably, the system is in the form of a single, portable, stand-alone unit, with the ink formulations conveniently corresponding to the PANTONE (Registered Trade Mark) color matching system.

According to another aspect of the invention there is provided a method of making a selected printing ink formulation from a plurality of printing ink formulations, each of which has predetermined proportions of constituent basic color inks by weight, the formulations and their predetermined proportions being held in memory means, the method comprising selecting one of the formulations on user interface means, noting on display means the constituent basic color inks to be added and their respective weights, and adding the successive constituent basic color inks to weighing means while the weight addition of each successive constituent basic color ink is monitored by the display means, thereby to make the selected formulation.

By linking the output of a suitable electronic weighing sensor which is able to weigh the constituent inks, the mixing process is monitored. The operator is thus guided through the weighing process by providing data on the amount and color of each constituent ink to be added. A correct ink formulation is then ensured.

Various embodiments of the invention are possible. For example, the weighing means may be integrated or a separate weighing scale could be used, with weight information communicated along a suitable signal path. The user interface means may be a dedicated keyboard and numerical display, or separate computer terminal. Data may be stored locally in electrical memory, or provided via a data link from another computer, or measuring equipment. Data may be fixed and predetermined as in the case of PANTONE formulations, or new formulations may be entered and stored as developed.

An embodiment of the invention will now be described, by way of example, with reference to the accompanying drawings, in which:

DESCRIPTION OF THE PREFERRED EMBODIMENT

Figure 1:
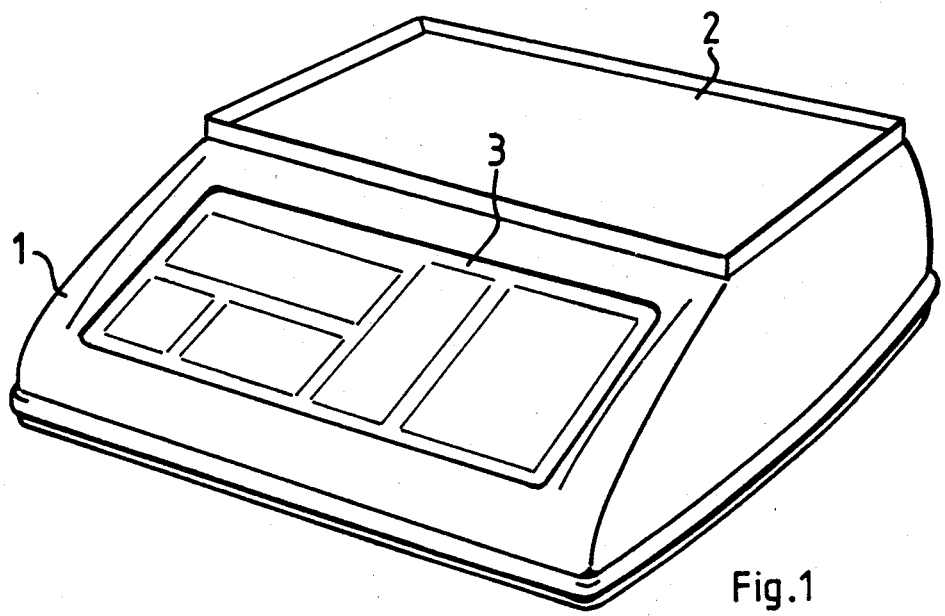
FIG. 1 is a view of an integrated, stand-alone unit according to the invention.

Referring to FIG. 1, the unit has a casing 1 from which is mounted a weighing pan 2 via a weighing sensor. The frame of the casing has a panel 3 with a keyboard and display shown in greater detail in FIG. 3.

Figure 2:
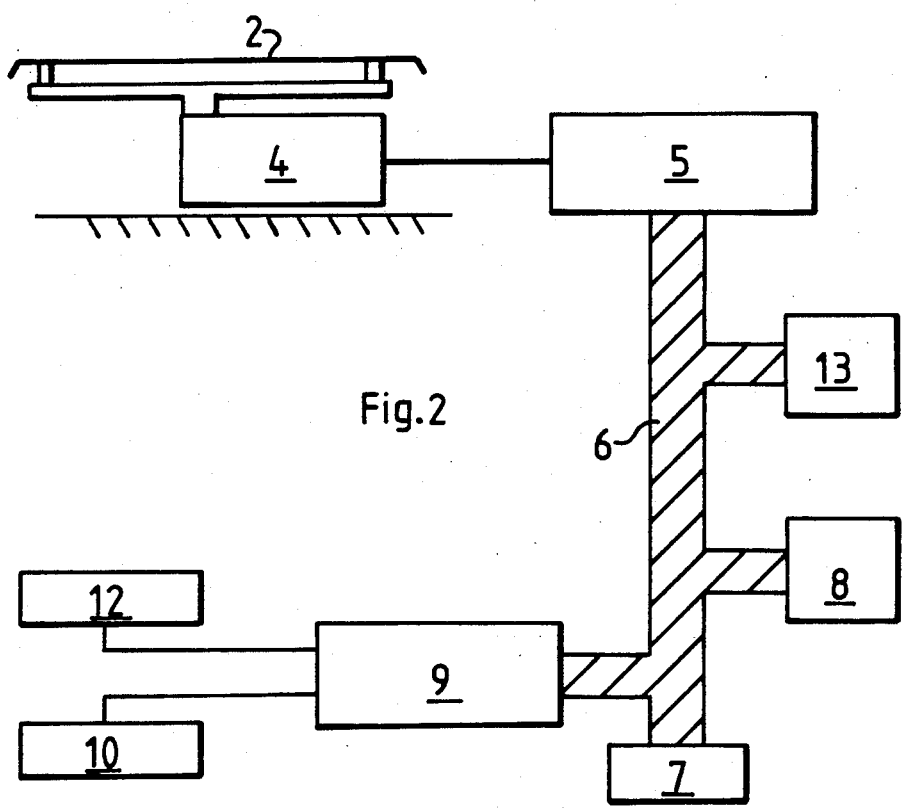
FIG. 2 is a schematic diagram of the unit of FIG. 1.

FIG. 2 shows a schematic diagram of the unit. Weighing is carried out on the pan 2, and a single point load cell 4 is used to convert weight to an analogue electrical signal. An analogue to digital convertor 5 then converts the weight information to digital form and is interfaced through a microprocessor bus 6 to a microprocessor 7. Ink formulation data is held in read only memory 8 which also may be accessed by the microprocessor 7. The operator key instructions from a keyboard 10 and digital data on a display 12 may also be accessed by the microprocessor 7 via a user interface 9. The microprocessor control program 13 governs the way the unit operates.

The data stored in RAM 8 corresponds to ink formulations for the PANTONE color matching system. Each colour shade is thus identified by a unique three digit code. Data is stored for each code in terms of the percentage constituents of each basic color ink used.

Figure 3:
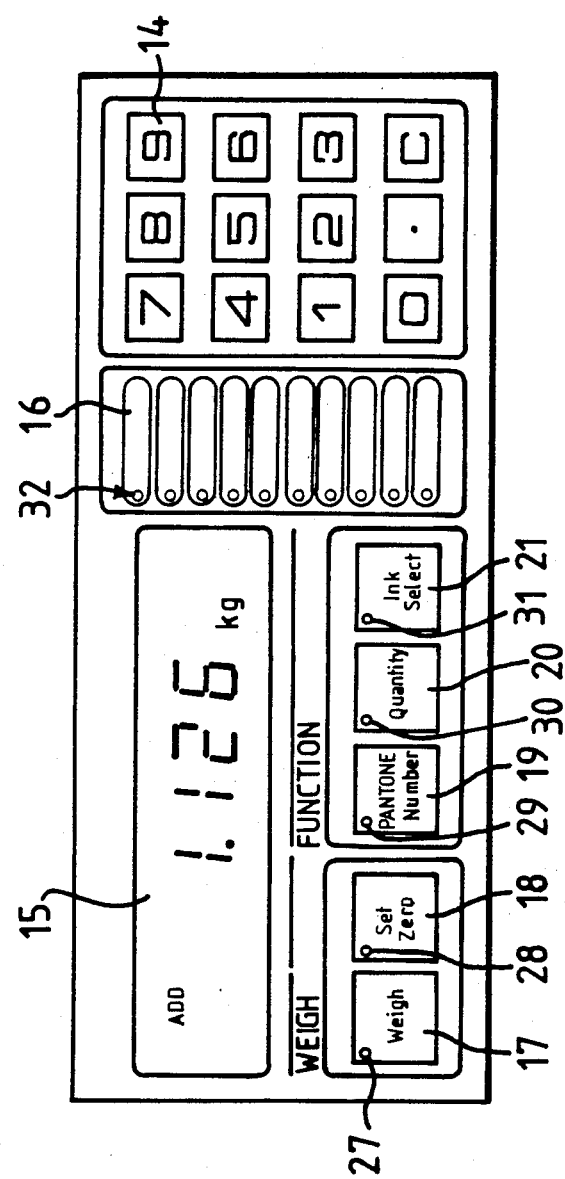
FIG. 3 is an enlarged view of a keyboard and display of the unit.

FIG. 3 shows the panel 3 which provides a keyboard 14, a digital display 15 having five seven segment LEDs, an ink constituent display panel 16, and five function keys 17 to 21. Keys 17 and 18 are grouped under the heading WEIGH and keys 19 to 21 under the heading FUNCTION.

The corner of each key 17 to 21 has a corresponding LED 27 to 31, and each of the constituent colours indicated in the panel 16 has a corresponding LED, indicated generally at 32. The panel 3 is preferably a membrane type keyboard capable of cleaning with normal solvents, and key operation is acknowledged both by an audible bleep, and visual change of displays and indicators.

When power is first applied, the unit performs a short self test routine. All displays are illuminated and then extinguished so that their operation can be checked. The unit automatically selects weight display and sets the scale to zero.

When the key 17 is pressed, the unit operates as a simple digital scale. The display 16 registers the weight in kilograms (or pounds) of a load placed on the pan 2. In this 'weigh' mode, the LED 27 is illuminated and the set zero key 18 is active and may be used to reset zero weight or tare any weight on the scale pan 2. The LED indicator 28 is illuminated when the scale is at the defined zero weight.

The three keys 19 to 21 are used for making a PANTONE color ink formulation. Key 19 is used to enter the PANTONE number of the color formulation required. After pressing the key 19, the PANTONE number is keyed into the keyboard 14 and the number is shown in the display 15 as it is entered. Key 20 is used to enter the required quantity (i.e. the weight) of the formulation. After pressing the key 20, the required weight is keyed into the keyboard 14, and this is displayed on the display 15 as it is entered.

On pressing the key 21, the weight of any suitable container placed on the pan 2 will be automatically stored. The LED indicator 32 beside the first constituent basic colour ink (e.g. Pantone Yellow) will be illuminated, and the display 15 will show the legend ADD and the amount of the first constituent basic color ink to be added. As the first constituent basic color ink is added to the container in the pan 2, the amount shown on the display 15 decreases, until the exact amount of constituent basic color ink has been added, when the display 15 will show zero. If too much ink has been added the legend AND will change to REMOVE, and the display will show the weight of ink to be removed.

The key 21 is pressed again, and the LED indicator 32 beside the second constituent basic color ink (e.g. Pantone Warm Red) is illuminated, and the amount of the second constituent basic color ink to be added is shown on the display 15. Addition of the second constituent basic color is monitored as for the first constituent ink and the process is repeated for any subsequent constituent basic color ink until correct weights of all the constituent basic color inks have been added. At the end of the weighing sequence, the key 21 may be pressed to step through the constituent basic color inks to check that all have been reduced to zero.

The described embodiment is thus a special purpose electronic weighing scale, designed to aid the accurate mixing of particular shades and colors of PANTONE printing inks.

Having disclosed my invention, what I claim as new and to be secured by Letters Patent of the United States is:

1. A system for making a selected printing ink formulation from a plurality of printing ink formulations, each said formulation having predetermined proportions of constituent basic color inks by weight, the system comprising weighing means for weighing the constituent basic color inks, memory means for storing said predetermined proportions of each said plurality of formulations, said plurality of formulations stored in said memory means corresponding to a known color matching system with distinctive identification symbols such as numbers for each formulation, user interface means comprising a keyboard enabling a user to select one of said formulations, display means for displaying the weight of each constituent basic color ink to be added to said weighing means and for monitoring the weight addition of each successive constituent basic color ink, to enable the user to make said selected formulation, said user interface means including three function keys and said display means including an ink constituent display panel showing said constituent color inks of said known color matching system, a first of said function keys being operative to enable a desired formulation symbol to be entered in said keyboard, a second of said function keys being operative to enable the desired weight of said formulation to be entered on said keyboard and a third of said keys being operative to cause said successive color constituent basic color inks to be displayed on said constituent display panel, said display of each constituent ink on said display panel being accompanied by an indication on said display means of the weight of that constituent basic ink to be added to said weighing means, whereby as each constituent basic color ink is added to said weighing means the displayed amount to be added correspondingly decreases until said display means indicates that no further amount of constituent basic inks need be added.

2. A system for making a selected ink formulation from a plurality of printing ink formulations, each said formulation having predetermined proportions of constituent basic color inks by weight, the system comprising weighing means for weighing the constituent basic color inks, memory means for storing said predetermined proportions of each said plurality of formulations, said plurality of formulations stored in said memory means corresponding to the PANTONE color matching system, user interface means comprising a keyboard enabling a user to select one of said formulations, display means for displaying the weight of each constituent basic color ink to be added to said weighing means and for monitoring the weight addition of each successive constituent basic color ink, to enable the user to make said selected formulation, the system being in the form of a single, portable, stand-alone unit, said user interface means including three function keys and said display means including an ink constituent display panel showing said constituent color inks of the PANTONE color matching system, a first of said function keys being operative to enable a desired PANTONE number to be entered in said keyboard, a second of said function keys being operative to enable the desired weight of said formulation to be entered on said keyboard and a third of said keys being operative to cause said successive color constituent basic color inks to be illuminated on said constituent display panel, said illumination of each constituent ink on said display panel being accompanied by an indication on said display means of the weight of that constituent basic ink to be added to said weighing means, whereby as each constituent basic color ink is added to said weighing means the displayed amount to be added correspondingly decreases, until the displayed amount to be added shows zero on said display means.

3. A system according to claim 2, wherein said weighing means is a load cell.

4. A system according to claim 2, wherein said display means indicate the weight of any constituent basic color ink to be removed, if more constituent ink is added than is required for the desired formulation and the desired weight thereof.

5. A system for making a selected printing ink formulation from a plurality of printing ink formulations, each said formulation having predetermined proportions of constituent basic color inks by weight, the system comprising weighing means for weighing the constituent basic color inks, memory means storing the predetermined proportions of each of said plurality of formulations, a keyboard enabling a user to select one of said formulations, and display means for displaying the weight of each constituent basic color ink to be added to said weighing means and for monitoring the weight addition of each successive constituent basic color ink, to enable the user to make the selected formulation, wherein the ink formulations stored in the memory means correspond to the PANTONE color matching system, and wherein said keyboard includes three function key means and said display means includes an ink constituent display showing constituent basic color inks of the PANTONE color matching system, a first of said function key means being operative to enable a desired PANTONE number to be entered in said keyboard, a second of said function key means being operative to enable a desired weight of the formulation to be entered on said keyboard and a third of said key means being operative to cause the successive color constituent basic color inks to be displayed on said ink constituent display, the display of each constituent ink on said display means of the weight of that constituent basic color ink to be added to said weighing means.

6. A system according to claim 5 which is in the form of a single, portable, stand-alone unit.

7. A system according to claim 5, wherein said weighing means is a load cell.

8. A system according to claim 5, wherein said display means indicate the weight of any constituent basic color ink to be removed, if more constituent ink is added than is required for the desired formulation and the desired weight thereof.

9. A system according to claim 5, wherein as each constituent basic color ink is added to the weighing means the displayed amount to be added correspondingly decreases until the displayed amount to be added shows zero on said display means.

* * * * *